March 24, 1925. 1,530,902
J. S. MATTHEW
VEHICLE RIM
Filed May 19, 1923   2 Sheets-Sheet 1
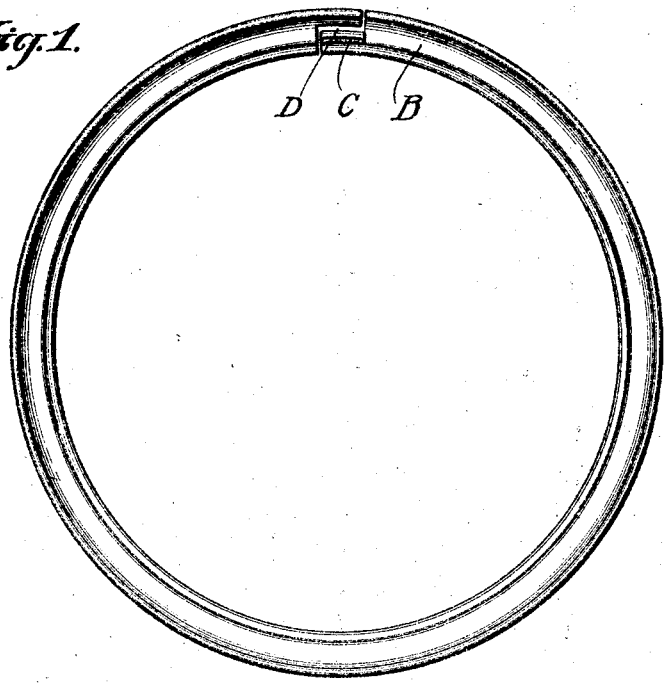
Fig. 1.
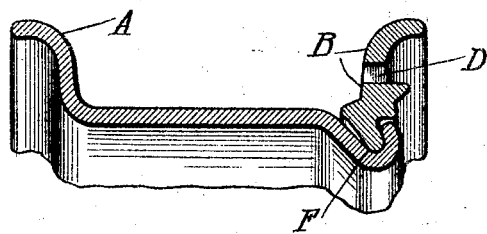
Fig. 2.
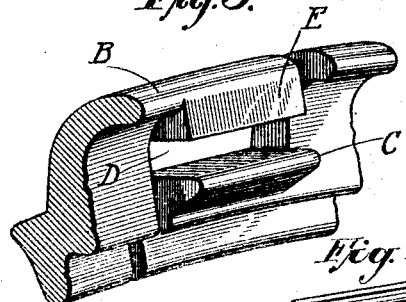
Fig. 3.
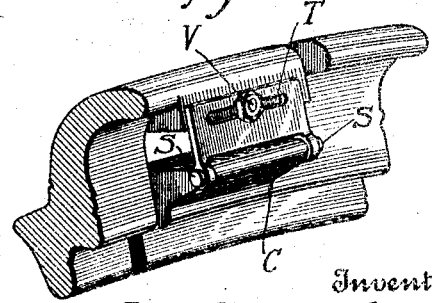
Fig. 4.
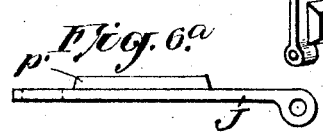
Fig. 4.a   Fig. 6.a
Inventor
John Smart Matthew.
By His Attorney

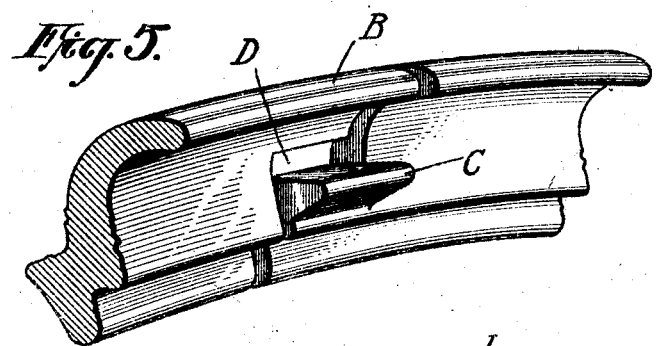
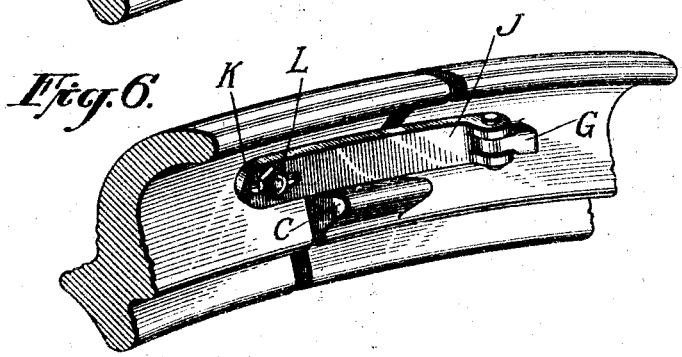
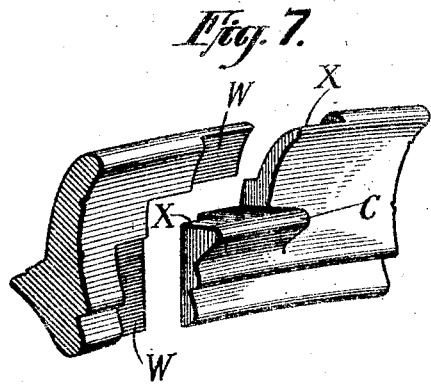
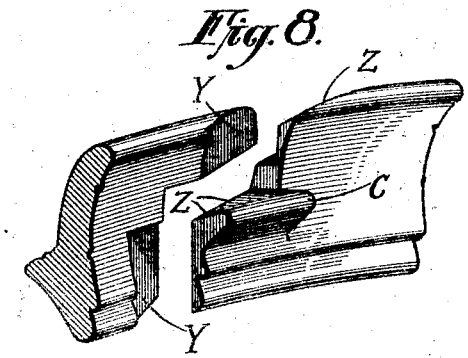

Patented Mar. 24, 1925.

1,530,902

UNITED STATES PATENT OFFICE.

JOHN SMART MATTHEW, OF SUTTON COLDFIELD, ENGLAND, ASSIGNOR TO DUNLOP RUBBER COMPANY LIMITED, A CORPORATION OF GREAT BRITAIN.

VEHICLE RIM.

Application filed May 19, 1923. Serial No. 640,021.

*To all whom it may concern:*

Be it known that I, JOHN SMART MATTHEW, a subject of the King of Great Britain, residing in Sutton Coldfield, Warwick County, England, have invented certain new and useful Improvements in Vehicle Rims, of which the following is a specification.

This invention relates to rims of wheels for road vehicles and particularly to those for use with tires of the straight sided type, which rims are provided with a split detachable side flange to ensure easier fitment of the tire thereto.

According to present practice the said split detachable flanges are constructed so as to fit into a groove in the rim and are provided with a slot or aperture at or near one end and at the edge thereof adjacent to the rim in such a manner that by the insertion of a screw driver or other suitable tool the said flange may be pried out of the said groove. The slot or aperture is not watertight and its position at the edge of the flange adjacent to the rim allows moisture to enter and detrimentally affect the rim and the bead portion of the tire attached thereto, rendering it extremely difficult to remove the tire from the rim owing to the bead thereof adhering firmly to the corroded surface of the rim. Further the use of the rim as a fulcrum destroys the paint or enamel thereon and may damage the rim itself.

An object of this invention is to provide an improved split detachable flange for the rims of road vehicles which shall be more nearly watertight than any hitherto constructed.

A further object of this invention is to provide such a flange as shall not necessitate the use of the outer edge of the rim for the purpose of removing or fitting the same to the rim.

According to this invention we employ one end of the detachable flange as a fulcrum for the removal or fitment of the other end thereof. The slot or aperture is located approximately halfway between the inner and outer circumferential edges of the flange and is at the extremity of the flange where the same is divided. The flange is so constructed that immediately beneath the slot or aperture a lug or projection is formed at the end of the flange, to serve as a fulcrum for the screw driver or other means employed for the removal of the flange. It also assists in the initial engagement of the flange in its groove in the process of fitment thereof to the rim. A lug projection or thickened portion may be provided at the other end of the flange immediately above the said slot to strengthen the flange at this point where it is subjected to repeated strains in the process of removal.

An embodiment of the invention is illustrated in the accompanying drawings in which—

Fig. 1 is a side view of a detachable flange made according to the said invention;

Fig. 2 is a cross section of the same, fitted to a rim, at the point where the flange is divided;

Fig. 3 is a side view of a flange at the point where the same is divided showing a modification thereof;

Figs. 4, 4ª, 6 and 6ª show various means of closing the slot as herein described;

Fig. 5 is a perspective view of part of a flange according to Fig. 1 but showing the joint in greater detail made according to the said invention;

Figs. 7 and 8 show two methods of overlapping the extremities of the said flange.

Referring to Figs. 1 and 2, A is a rim of the straight side type and B a detachable side flange constructed according to the said invention fitted in the groove F. C is the lug or projection at one extremity thereof hereinbefore referred to. D is the slot which is located approximately half way between the inner and outer circumferential edges of the said flange. When it is desired to remove the flange a screw driver or other tool used for the purpose is inserted in the slot D and the projection C serves as a fulcrum when the flange is removed from the groove F in such a manner that the tool does not press on the rim so as to damage the same. Referring to Fig. 3 E is a second lug or thickened portion above the slot D provided so as to strengthen the flange at this point.

Figs. 4 and 6 show two types of hinged attachments which may be provided for the purpose of closing the slot D.

Fig. 4 shows a means for effecting the closure of the said slot wherein a plate having a projection $p$ (shown in Fig. 4ª) to fit the slot is hingedly attached by means of pins S to the ends of the projection C, and is adjustably secured by a screw or nut and stud V in a slot T.

Referring to Fig. 6, G is a hinge attached to the flange in any suitable manner but preferably by being welded thereto. A plate J having a projection $p$ (shown in Fig. 6ª) slightly smaller than the slot D is fitted to the said hinge. The other end of the plate is provided with a slot K within which moves a screw or stud having a nut L to attach the same to the flange. Said slot K is provided so that the projection on the plate J may be easily fitted within the slot D.

Any other suitable means within the scope of the claims may be employed to close the slot and I do not confine myself to the construction shown.

Figs. 7 and 8 show the ends of the flange overlapped. In Fig. 7 projections or tongue pieces X fit into recesses W. Fig. 8 shows a similar arrangement wherein the ends of the flange are bevelled at Y and Z to form flat surfaces coacting with one another.

From the foregoing it is apparent that my invention provides an improved tire retaining flange and that the overlapping arrangement of the ends of the flange forms a slot for the insertion of a suitable flange removing tool. The fulcrum lugs or projections described permit of an increased leverage for the removing tool and the thickened portion of the flange formed adjacent to the slot provides a wide bearing for the end of the tool and also reinforces or strengthens the flange at the point where the greatest strain is exerted in removing the same from the rim. The hinged closures for the slot prevent the entrance of mud and other foreign matter containing moisture which would tend to rust the parts and interfere with their ready removal. These hinged portions also serve to hold or lock the meeting ends of the flange in proper position.

Though I have described with great particularity the embodiments of the invention herein shown it is not to be construed that I am limited thereto as changes in arrangement and substitution of equivalents may be made by those skilled in the art without departing from the invention as defined in the appended claims.

What I claim is—

1. In combination with a vehicle rim, a tire retaining flange having overlapping ends with portions cut away to form a slot for the insertion of a flange removing tool and a projection on said flange adjacent the slot forming a fulcrum for said tool.

2. In combination with a vehicle rim, a tire retaining flange having overlapping ends with portions cut away to form a slot for the insertion of a flange removing tool and means carried by said flange for closing the slot and locking the ends of the flange to one another.

3. In combination with a vehicle rim, a tire retaining flange having overlapping ends with portions cut away to form a slot for the insertion of a flange removing tool, one end of said flange having a thickened portion for engagement with the end of a flange removing tool.

4. In combination with a vehicle rim, a tire retaining flange having overlapping ends with portions cut away to form a slot for the insertion of a flange removing tool, one end of said flange having a thickened portion for engagement with the end of a flange removing tool and the other end of said flange having a projection serving as a fulcrum for said tool.

In witness whereof, I have hereunto signed my name.

JOHN SMART MATTHEW.